United States Patent
Krumdick et al.

(10) Patent No.: US 9,446,967 B2
(45) Date of Patent: Sep. 20, 2016

(54) METHOD FOR PRODUCING SIZE SELECTED PARTICLES

(71) Applicant: UCHICAGO ARGONNE, LLC, Chicago, IL (US)

(72) Inventors: Gregory K. Krumdick, Homer Glen, IL (US); Young Ho Shin, LaGrange, IL (US); Kaname Takeya, Valencia, CA (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 233 days.

(21) Appl. No.: 14/265,638

(22) Filed: Apr. 30, 2014

(65) Prior Publication Data

US 2014/0341797 A1 Nov. 20, 2014

Related U.S. Application Data

(60) Provisional application No. 61/823,064, filed on May 14, 2013.

(51) Int. Cl.
*H01M 4/00* (2006.01)
*H01M 4/02* (2006.01)
(Continued)

(52) U.S. Cl.
CPC ............. *C01G 53/06* (2013.01); *C01G 45/00* (2013.01); *C01G 51/06* (2013.01); *C01G 53/00* (2013.01); *C01G 53/006* (2013.01); *C01G 53/44* (2013.01); *H01M 4/485* (2013.01); *H01M 4/505* (2013.01); *H01M 4/525* (2013.01); *C01P 2004/03* (2013.01); *C01P 2004/32* (2013.01); *C01P 2004/51* (2013.01); *C01P 2004/52* (2013.01);
(Continued)

(58) Field of Classification Search
CPC .......... B01J 19/00; B01J 19/18; H01M 4/00; H01M 4/02; H01M 4/36; H01M 4/48; H01M 4/485; H01M 4/50; H01M 4/505; H01M 4/52; H01M 4/525; H01M 2004/21; C01G 45/00; C01G 51/00; C01G 51/06; C01G 53/00; C01G 53/006; C01G 53/06; C01G 53/40–53/44; C01P 2004/00; C01P 2004/01; C01P 2004/03; C01P 2004/30; C01P 2004/32; C01P 2004/51; C01P 2004/52; C01P 2004/60; C01P 2004/61; C01P 2006/00; C01P 2006/11
See application file for complete search history.

(56) References Cited

FOREIGN PATENT DOCUMENTS

JP 2012124147 A * 6/2012

OTHER PUBLICATIONS

Machine translation of JP 2012124147 A, published on Jun. 28, 2012.*

*Primary Examiner* — Natasha Young
(74) *Attorney, Agent, or Firm* — Cherskov Flaynik & Gurda, LLC (57) ABSTRACT

The invention provides a system for preparing specific sized particles, the system comprising a continuous stir tank reactor adapted to receive reactants; a centrifugal dispenser positioned downstream from the reactor and in fluid communication with the reactor; a particle separator positioned downstream of the dispenser; and a solution stream return conduit positioned between the separator and the reactor. Also provided is a method for preparing specific sized particles, the method comprising introducing reagent into a continuous stir reaction tank and allowing the reagents to react to produce product liquor containing particles; contacting the liquor particles with a centrifugal force for a time sufficient to generate particles of a predetermined size and morphology; and returning unused reagents and particles of a non-predetermined size to the tank.

17 Claims, 10 Drawing Sheets

(51) Int. Cl.
  *H01M 4/36* (2006.01)
  *H01M 4/48* (2010.01)
  *H01M 4/50* (2010.01)
  *H01M 4/52* (2010.01)
  *C01G 45/00* (2006.01)
  *C01G 51/06* (2006.01)
  *C01G 53/00* (2006.01)
  *C01G 53/06* (2006.01)
  *H01M 4/485* (2010.01)
  *H01M 4/505* (2010.01)
  *H01M 4/525* (2010.01)
  *B01J 19/00* (2006.01)
  *B01J 19/18* (2006.01)
  *C01G 51/00* (2006.01)

(52) U.S. Cl.
  CPC ........ *C01P 2004/61* (2013.01); *C01P 2006/11* (2013.01); *H01M 2004/021* (2013.01); *Y02E 60/122* (2013.01)

| | Carbonate Cathode | | | Hydroxide Cathode | | |
|---|---|---|---|---|---|---|
| Lot # | (1) ANL-101217B | (2) ANL-120905 | (3) ANL-1108102 | (4) ANL-130110 | (5) JPL | (6) Toda-HE5050 |
| Scale | Bench scale | Pre-pilot scale Optimized | Bench scale | Pre-pilot scale Preliminary | Bench Scale (contains Co) | Commercial (contains Co) |
| SEM x 3,000 | | | | | | |
| SEM x 8,000 | | | | | | |
| ICP analysis | $Li_{1.35}Ni_{0.32}Mn_{0.68}O_y$ | $Li_{1.37}Ni_{0.3}Mn_{0.3}O_y$ | $Li_{1.3}Ni_{0.3}Mn_{2/3}O_y$ | $Li_{1.35}Ni_{1/3}Mn_{2/3}O_y$ | $Li_{1.61}Ni_{0.16}Mn_{0.71}Co_{0.13}O_y$ | $Li_{1.52}Ni_{0.16}Mn_{0.71}Co_{0.13}O_y$ |
| $D_{10}/D_{50}/D_{90}$ [μm] | 7.6 / 12.7 / 21.0 | 6.9 / 11.1 / 18.4 | 7.7 / 13.2 / 22.1 | 2.4 / 4.7 / 8.9 | 1.2 / 11.1 / 29.3 | 3.1 / 5.3 / 9.2 |
| Tap density [g/cc] | 1.41 | 1.70 | 0.98 | 1.02 | 1.70 | 1.03 |

METHOD FOR PRODUCING SIZE SELECTED PARTICLES

CROSS REFERENCE TO RELATED APPLICATIONS

This application claims the benefit of priority to U.S. Provisional Patent Application No. 61/823,064, filed on May 14, 2013, currently pending, the contents of which are hereby incorporated by reference.

CONTRACTUAL ORIGIN OF THE INVENTION

The U.S. Government has rights in this invention pursuant to Contract No DE-AC02-06CH11357 between the U.S. Government and UChicago Argonne, LLC representing Argonne National Laboratory.

BACKGROUND OF THE INVENTION

1. Field of the Invention

This invention relates to a method for producing size selected particles, and more particularly this invention relates to a co-precipitation method for consistently producing particles within a predetermined size from a fluid containing relatively tiny and huge particles.

2. Background of the Invention

Certain sized particles as electrode active materials for secondary batteries, or as catalysts for chemical reactions, can optimize the performance associated with their applications. However, consistent generation of uniform sized particles, and the uniformed sized particles themselves remain elusive. This is because particles under one micron easily coagulate, aggregate, or associate with each other irregularly. Particle aggregation refers to formation of clusters in a colloidal suspension and represents the most frequent mechanism leading to unwanted particle growth. During this process, which normally occurs within short periods of time (seconds to hours), particles dispersed in the liquid phase stick to each other, and spontaneously form irregular particle clusters, flocs, or aggregates. As aggregation proceeds from early to later states, the aggregates grow to size of 1-100 micron, depending on the reagents used and the reaction method.

Efforts have been made to produce and maintain particles below 20 microns. Batch and continuous reactors have been part of these efforts.

Particle sizes of electrode active material precursor and electrode active material produced during co-precipitation using conventional continuous stirred tank reactor (CSTR) vary widely from a few nanometers to several dozen micrometers. This varying particle size lowers tap density and reduces the performance of lithium secondary batteries. For example, tiny particles (e.g., less than 500 nm in diameter) increase the total surface area of electrode active materials. This in turn leads to a decrease in the cycle life of the battery due to side reactions with electrolyte on the high surface area of the small particles.

Conversely, very large particles (e.g., more than 40 μm) cause problems with cathode coatings and create short circuits in the batteries.

Sieving processes have been used to produce specific sized particles. However, sieving does not eliminate particles at the small end of the spectrum. In addition, separated large particles are disposed of as an off-spec secondary waste stream.

Sedimentation methods have been employed to eliminate tiny particles, but these methods require time and several repetitions. Air-classification has also been used to separate dried particles in certain size ranges. These processes involve cycloning whereby dried powder materials are subjected to centrifugal force and therefore particle collision and rotor blade collision. This leads to particle loss and particle damage.

Batch reactors have been used to produce similar particle sizes. However, uniformity of particle sizes between batches is hit or miss. Specifically, average particle size, particle size distribution and quality of particles generated via batch processes fluctuate more than is acceptable.

A need exists in the art for a method to produce specific sized electrode active material precursor and electrode active material precursor without tiny and huge particles. The method should consistently produce uniform sized particles so as to optimize the tap density of the particles being produced. The method should incorporate common materials processing protocols.

SUMMARY OF INVENTION

An object of the invention is to provide a method for producing size selected particles that overcomes many of the drawbacks of the prior art.

Another object of the present invention is to produce size selected particles in a continuous process. A feature of the invention is the use of post-reactor particle polishing steps. An advantage of the invention is that it produces tight size-range particles and with desired morphologies. This invention provides a method and system for producing uniform spherical particles with high tap densities.

Another object of the invention is to provide a construct comprising different size selected particles. A feature of the invention is the use of a plurality of continuous stir reaction protocols to produce the different sized particles. An advantage of the invention is that the different sized particles are predetermined and substantially all of the reagents are utilized to continuously produce the particles in a co-precipitation protocol, such that reagents are recycled and reprocessed.

Yet another object of the present invention is to provide a system and method for continuously producing different sized materials and assembling those materials. A feature of the invention is the use of a plurality of continuous stir tank reactors and a plurality of centrifugal processing units each of the reactors and the processing units devoted to producing one particle size and morphology. An advantage of the invention is that tap densities of ensuing constructs are higher than what is produced in state of the art protocols, and this results in enhanced characteristics of the product comprised of the particles. For example, secondary batteries comprised of particles having high tap density results in those batteries having increased energy density.

Still another object of the present invention is to provide a method and a system for producing particles with optimal tap density (e.g., greater than 1.65 g/cc). A feature of the invention is the use of centrifugal force (e.g. centrifugal dispersers and dispensers) to remove tiny adherents from desired sized particles and simultaneously to polish the desired sized particles to a specific morphology (e.g., spherical shapes). An advantage of the invention is that it provides a polished particle and properly sized particle in one step.

A further object of the present invention is to provide a system of producing a uniform size distribution of metal particles that reduces the amount of deionized water used and, consequently, the amount of wastewater produced. A feature of the present invention is that the small particle return stream flows into a alkaline solution preparation tank where solid alkaline feed is added to the recycled water. This alkalinized solution then enters the reactor tank to mix with the metal reagent solution. An advantage of the present invention is that the same amount of product is created while halving the amount of deionized water used and wastewater produced.

Briefly, the invention provides a system for preparing specific sized particles, the system comprising a continuous stir tank reactor adapted to receive reactants; a centrifugal dispenser positioned downstream from the reactor and in fluid communication with the reactor; a particle separator positioned downstream of the dispenser; and a solution stream return conduit positioned between the separator and the reactor.

Also provided is a method for preparing specific sized particles, the method comprising continuously stirring the reagents to produce product liquor containing particles; contacting the liquor particles with a centrifugal force for a time sufficient to generate particles of a predetermined size and morphology; and returning particles of a non-predetermined size to the continuous stir venue, be that a continuous stir reaction tank, agitator or the like.

The invention further provides a system for preparing a plurality of specific sized particles, the system including a plurality of particle producing modules, each module comprising a continuous stir tank reactor adapted to receive reactants; a centrifugal dispenser positioned downstream from the reactor and in fluid communication with the reactor; a particle separator positioned downstream of the dispenser; and a solution stream return conduit positioned between the separator and the reactor.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
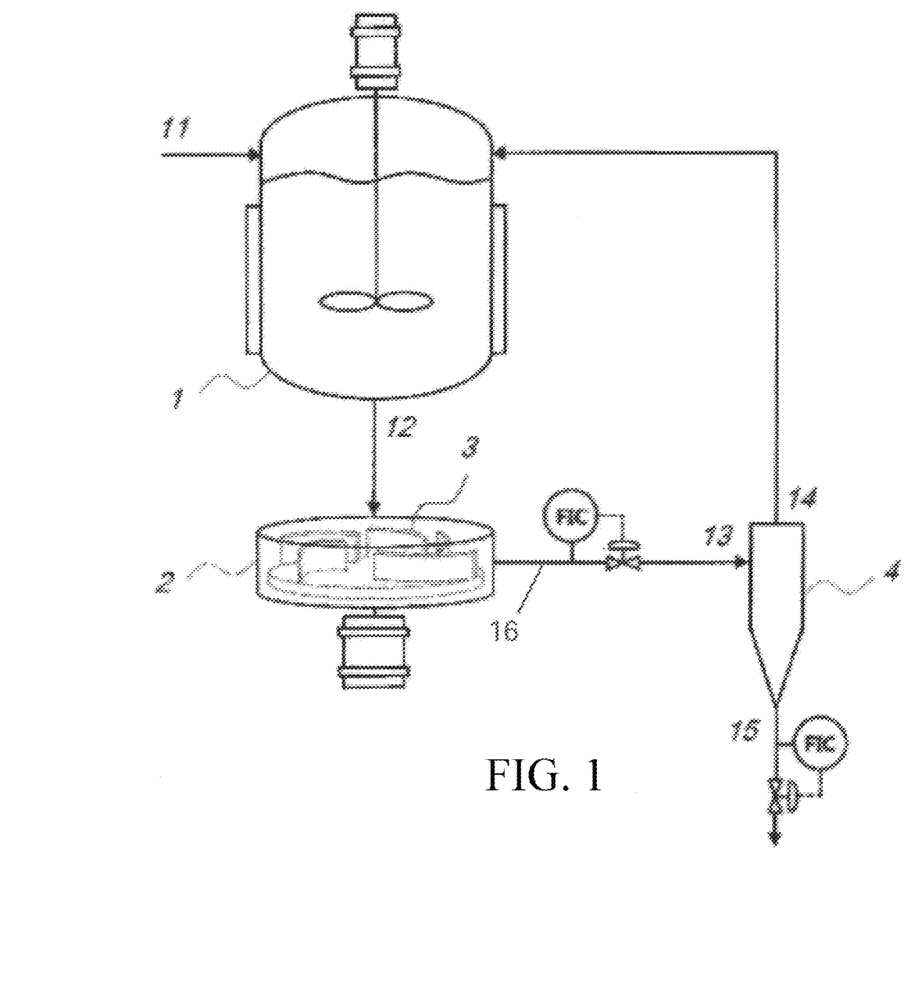
FIG. 1 is a schematic diagram of a system for producing size-selected particles, in accordance with features of the present invention.

FIG. 1 is a schematic diagram of a system comprising a continuous stirred tank reactor 1 combined with a centrifugal disperser 2 and a particle size separator 4. A salient feature depicted is the return of relatively small particles 14 to a continuous stirred tank reactor 1 for further growth. In an embodiment of the invention, agglomeration is used to form desired sized particles. For example, agglomeration of very tiny particles (e.g., under 1~100 nm) is used to produce a growing particle (from 100 nm to the desired size such as 10 micron).

FIG. 1 can be considered a module for producing particles of a single predetermined size. As such, a plurality of modules can be combined to generate particle streams, each of which has particles of predetermined size. Such a combination of modules is depicted in FIG. 11.

Figure 11:
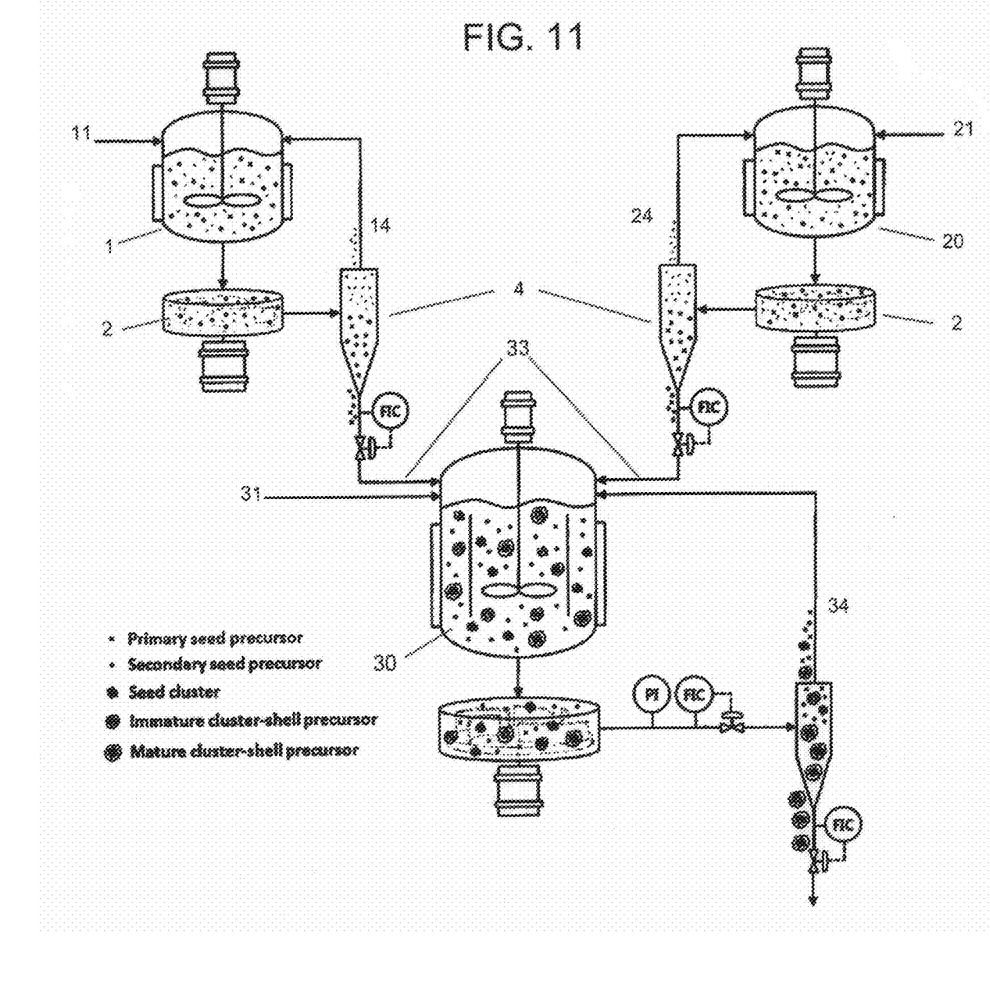
FIG. 11 is a schematic of a multi-module system, in accordance with features of the present invention.
Figure 12A:
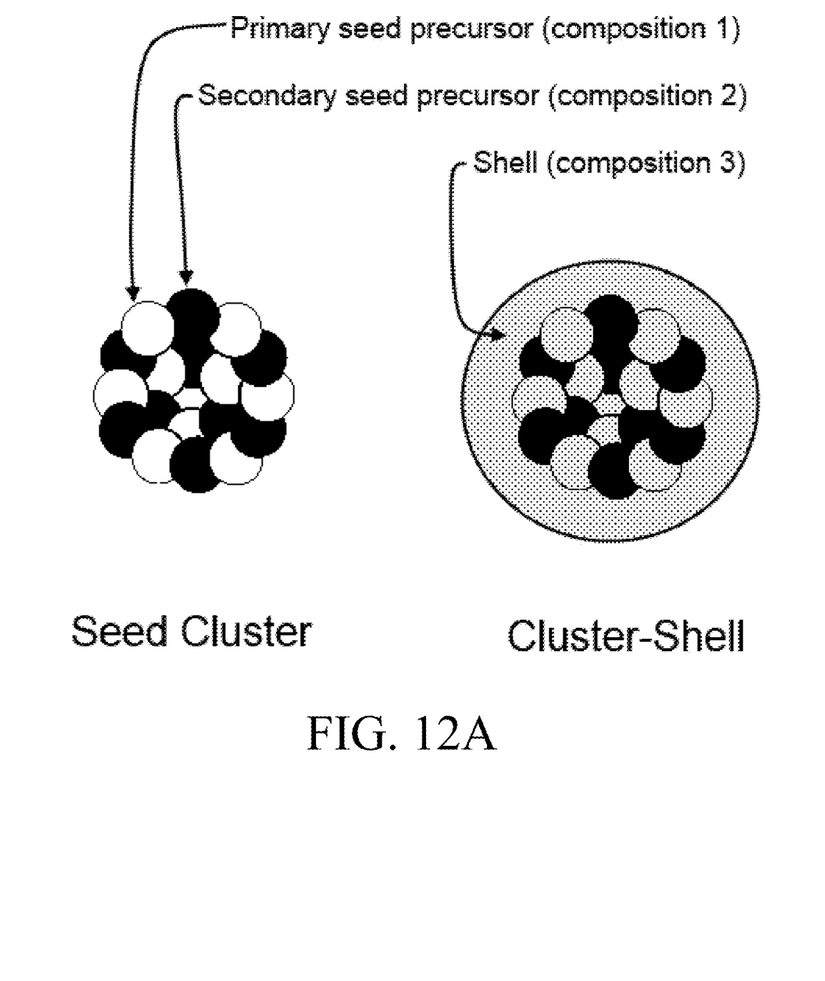
FIG. 12A is a schematic of a cluster shell product, in accordance with features of the present invention.

While FIG. 1 is a module to generate a single sized particle, FIG. 11 is a combination of modules to generate a sized particle from each module. For example, and as depicted in FIG. 12A, the multi-module system enables the production of cluster-shell type materials composed of primary seed particles, secondary seed particles and shells. The primary seed particles may be generated in the first reactor 1 depicted in FIG. 11, while the secondary particles may be generated in the second reactor 20 depicted in FIG. 11, and the shell particles may be generated in the third reactor 30. As such, each of the reactor modules will have separate small particle return lines 14,24 and 34 to recycle unreacted reagent or too small of particles. Conduits 33 from each of the particle collectors 4 downstream of the first 1 and second 20 reactors direct first and second size selected particles to the third reactor 30.

Each of the reactors may accommodate different reactant streams, for example reactor 1 accommodating a first reactant stream 11, reactor 20 accommodating a second reactor stream 21 and reactor 30 accommodating a third reactor stream 31. It should be understood that the system is not limited to the three reactors depicted in FIG. 11.

The multi-module scenario depicted in FIG. 11 enables the continuous production of cluster shell morphology cathode materials. The cluster shell may comprise a plurality (e.g. two) of different seed precursors encapsulated in a shell material.

Figure 12B:
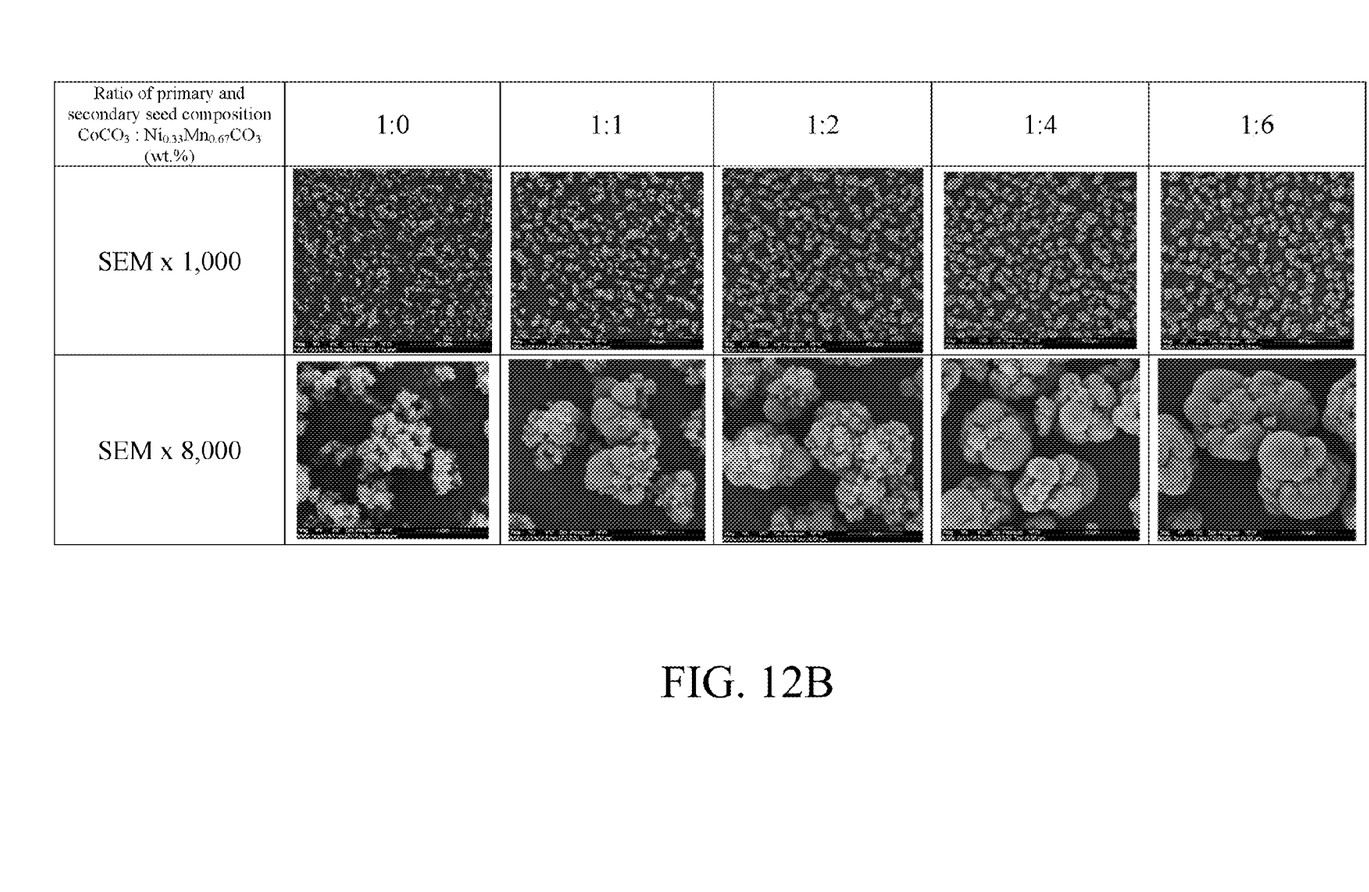
FIG. 12B is a table featuring micrographs of seed clusters, in accordance with features of the present invention.

FIG. 12B depicts SEM micrographs of seed clusters featuring two seed types. The primary seed material was $CoCO_3$. The micrographs on the far left of the graph contain only $CoCO_3$, (thus the 1:0 ratio). The micrographs depicted to the right of the first micrograph all contain varying amounts of $Ni_{0.33}Mn_{0.67}CO_3$ secondary seeds (i.e., from weight ratios ranging from 1:1 to 1:6).

As depicted on the second row of higher definition micrographs, the more secondary seed material that is added, the more the seed clusters begin to approach a spherical morphology and act as a shell composition. The addition of secondary seed material provides a means for encapsulating smaller particles, i.e., enabling the development of a shell around smaller particles contained within it.

The aforementioned module, either alone (e.g., FIG. 1) or in combination with other modules (e.g., FIG. 11), can operate at a myriad of temperature and pressures. For example, the system can operate at between approximately 1 and approximately 100 bar and between about 0 and about 450° C. Absent the need for operation in adverse conditions, the system is generally operated at about 1 bar (atmospheric pressure) and about 50° C.

Centrifugal Polishing Detail

The inventors found that imparting centrifugal forces on particles produced in the first steps of the invented process provides a means for tailoring particle morphology and size. Suitable centrifugal based equipment generates the shearing force necessary to produce targeted particle sizes and morphologies. For example, a centrifugal dispenser coupled to a transfer pump is a means for providing tailored particle sizes and morphologies, particularly for materials having high tap densities of about 1.65 g/cc or greater. (For a given material composition, tap density has a strong relation with particle morphology and size which are determined by synthesis processes. Higher tap density is desired to reduce the volume of batteries.) Generally, tap densities range from between about 1.5 and about 3.0 g/cc are obtained with the invented process. For example, in one embodiment, tap densities of about 1.71 g/cc or greater have been achieved.

Figure 13:
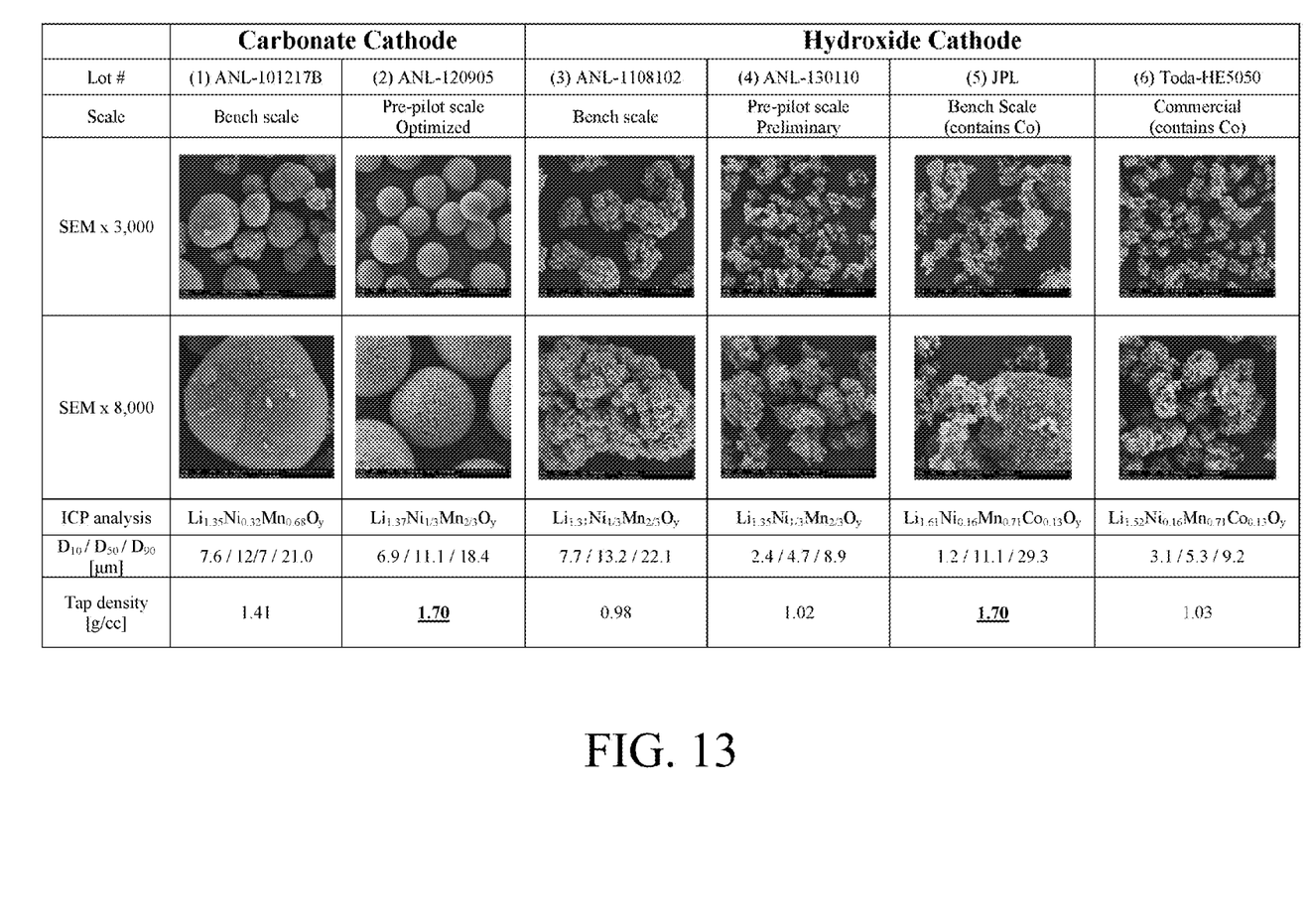
FIG. 13 is a chart depicting characteristics of materials produced, in accordance with features of the present invention.

This invention provides high tap densities above 1.65 g/cc in case of lithium-rich and manganese-rich electrode active materials ($Li_{1.37}Ni_{1/3}Mn_{2/3}O_y$, in FIG. 13). Typically, the invented process and system provides about a 20 percent increase in tap density for same material composition (See density increase in FIG. 13, to wit: from 1.41 to 1.7 g/cc). These improved materials are depicted in FIG. 13 as second sample 120905. This compares to lower tap densities (of about 1.41 g/cc) for materials produced using conventional CSTR, those materials depicted in FIG. 13 as first sample 101217B. Such a dispenser provides strong agitation combined with a transfer pump Alternatively, a centrifugal disperser is utilized to produce particles having higher hardness values. Such a disperser is a centrifugal pump comprising a centrifugal impeller. Centrifugal dispersers are more efficient than dispensers for size control and sphericalization of precursor material and active material. The inventors found that centrifugal dispersers causes more frequent collisions between particles, particularly along the peripheral regions of the disperser, where the impeller blades terminate and therefore travel at the highest velocity compared to other regions of the blades.

A centrifugal disperser 2 provides a means for creating size control and desired morphologies of the particles being processed. The disperser utilizes centrifugal force by rotation to create shear stress and fluid flow velocity and particle collisions with each other and with impellers 3 (depicted in phantom in FIG. 1) of the disperser 2.

The system depicted in FIG. 1 includes a reactant feed stream 11 in fluid communication with the CSTR 1. A first end of a conduit 12 provides egress of particles out of the CSTR, while a second end of the conduit 12 provides particle ingress to the centrifugal disperser 2. In the embodiment shown the first end of the conduit is positioned at approximately the center of the depending end of the CSTR 1.

A means of egress 16 is provided for the particles from the disperser 2. This egress means 16, (.e.g, a conduit such as a pipe or channel) defines a particle size separator inlet stream into a particle size separator 4. Suitable size separators include, but are not limited to centrifugal separators, hydrocyclones, filters separators, sedimentation tanks and combinations thereof. The separator 4 bifurcates the inlet stream 13 into a desired-size particle solution outlet stream 15 and a particle solution return stream 14 for particles which are smaller in size than the sizes of the desired particles. A suitable particle sized separator is a hydrocyclone from which the flow rate of desired-size particle solution outlet stream is about 5 to about 200 percent of the flow rate of the tiny particle (smaller than about 1 micron) solution return stream, and preferably 10 to 75 percent.

Another suitable particle size separator is a settling tank whereby natural sedimentation methods are utilized.

Reagent and Product Detail

A myriad of reactant mixtures are suitable for use with the invented method and system. In an embodiment of the invention, the reagent comprises metals selected from the group consisting of K, Sc, Ti, V, Cr, Mn, Fe, Co, Ni, Cu, Zn Y, Zr, Nb, Mo, Tc, Ru, Rh, Pd, Ag, Cd, Ta, W, Os, Ir, Pt, Au, La, Ce, Sm, Gd, Ac, Th, Al, Si, P, S, Ga, Ge, As, Se, In, Sn, Sb, Te, Ti, Pb, Bi and combinations thereof. The reagent further includes alkalinizing agents selected from the group consisting of alkali metal hydroxides, alkali metal carbonates, alkaline earth metal hydroxides, alkaline earth metal carbonates, ammonium compounds, and combinations thereof. Suitable species of these alkalinizing agents include, but are not limited to LiOH, NaOH, KOH,, RbOH, CsOH, $Be(OH)_2$, $Mg(OH)_2$, $Ca(OH)_2$, $Sr(OH)_2$, $Ba(OH)_2$, $Li_2CO_3$, $Na_2CO_3$, $K_2CO_3$, $Rb_2CO_3$, $Cs_2CO_3$, $BeCO_3$, $MgCO_3$, $CaCO_3$, $SrCO_3$, $BaCO_3$, ammonium hydroxide, ammonium nitrate, ammonium acetate, ammonium bicarbonate, ammonium carbonate, ammonium phosphate, ammonium carbamate and combinations thereof.

In operation, initially, the metal reagents and the alkalinizing agents are dissolved in liquid solutions prior to entering the tank reactor 1. The metal reagents are dissolved in acidic solutions derived from inter alia chlorides, nitrates, sulfates, and phosphates. The alkalinizing agents are typically dissolved in deionized water. (.e.g, for the synthesis of $Ni_{0.33}Mn_{0.67}CO_3$, 0.165~0.66 M $NiSO_4(H_2O)_6$ and 0.335~1.34 M $MnSO_4(H_2O)$ were used for the metal reagents and 0.01~25 M $NH_4OH$ and 0.5~2 M $Na_2CO_3$ and were used for the alkalinizing agents).

In the embodiment depicted in FIG. 1, each liquid reagent solution is introduced to the tank reactor 1 independently (feed stream 11). In another embodiment, the metal reagents enter the reactor after pre-combination, followed by the alkalinizing agents after pre-combination.

In another embodiment (FIG. 14) discussed below, solid or liquid alkalinizing agents are mixed with the recycled solution from the particle solution return line 14. This newly mixed alkalinizing solution is then introduced to the reactor tank 1 via an ingress line 19 separate from the feed stream 11. The feed stream 11 in this embodiment only contains the liquid, metal-containing solution. The advantages of this embodiment are decreasing fresh deionized water (DI) water usage for alkalinizing agent preparation, reusing unreacted alkalinizing agents, reducing wastewater generation, and lowering the operation cost by the usage of hot recycled solution from the particle solution return line 14.

The reactants remain in the CSTR for a time and at a temperature sufficient to cause particles of a target size to be generated. Suitable residence time in the CSTR at room temperature range from between about 2 hours and about 20 hours. Suitable temperatures range from between about 0° C. and about 250° C. at the pressure of between about 1 bar and about 50 bar.

After a suitable dwell time in the reactor, the formed particles are directed to the particle polishing means, such as the centrifugal devices described supra. RPM values between about 300 and about 5000 are suitable, when temperatures between about 0° C. and about 250° C. are present. Suitable internal pressures in which the invented system operates are between about 1 bar and about 50 bar.

Figure 14:
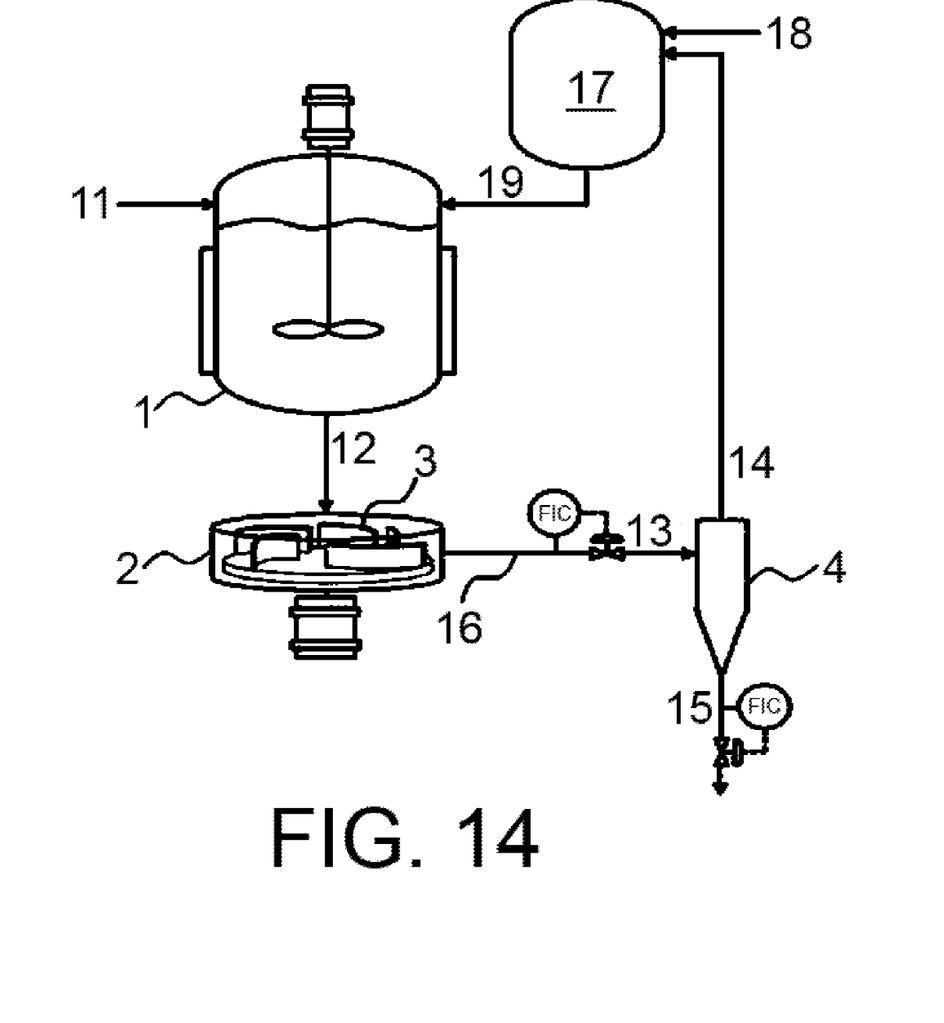
FIG. 14 is a schematic depiction of an alternate embodiment of a reduced wastewater system, in accordance with the features of the present invention.

The systems depicted in FIGS. 1 and 14 are operated continuously but also can be operated as batch processes at the reaction pressure of between about 1 bar and about 50 bar. For continuous operation, suitable feed flow rates of the metal reagents and alkalinizing agents are selected to keep the residence time in the CSTR range from between about 2 hours and about 20 hours, and preferably between about 5 hours and about 8 hours. (e.g., for 20 L CSTR, the feed flow rate of pre-combined metal reagents is 3.3 L/hr and the feed flow rate of pre-combined alkalinizing agents is 3.3 L/hr to make the residence time in the CSTR about 3-4 hrs, generally and about 3 hours typically).

The inventors have generated electrode active material precursors and electrode active materials for secondary batteries via the invented system and method. For example, Mn $CO_3$, $Ni_{0.15}Mn_{0.85}CO_3$, $Ni_{0.25}Mn_{0.75}CO_3$, $Ni_{0.35}Mn_{0.65}CO_3$, $Ni_{1/3}Mn_{2/3}CO_3$, $Ni_{1/3}Mn_{2/3}(OH)_2$, $Ni_{0.16}Mn_{0.71}Co_{0.13}(OH)_2$, $Li_2MnO_3$, $Li_{1.65}N_{0.15}Mn_{0.85}O_y$, $Li_{1.46}N_{0.25}Mn_{0.75}O_y$, $Li_{1.23}N_{0.35}Mn_{0.65}O_y$, $Li_{1.39}N_{1/3}Mn_{2/3}O_y$, and $Li_{1.57}Ni_{0.16}Mn_{0.71}Co_{0.13}O_y$, have been produced using metal feed reagents and hydroxide or carbonate feed reagents. Reactor volumes of between about 4 L and 20 L have been realized.

A salient feature of the invention is that it enables carbonate and hydroxide chemistry resulting in uniform spherical particles with high tap density. This differs from state of the art carbonate protocols which generate tiny (smaller than about 1 micron) and huge (bigger than about 30 micron) particles with low tap density. As such, the invention enables the creation of materials having high crack resistance. This invention enables the production of crack-resistant materials inasmuch as it eliminates loose contact between particles. Conversely the invention maximizes surface to surface contact between particles, by facilitating high tap densities.

FIG. 13 provides a chart of electrode active materials produced with both carbonate and hydroxide reagents using the invented method and system.

Figure 2:
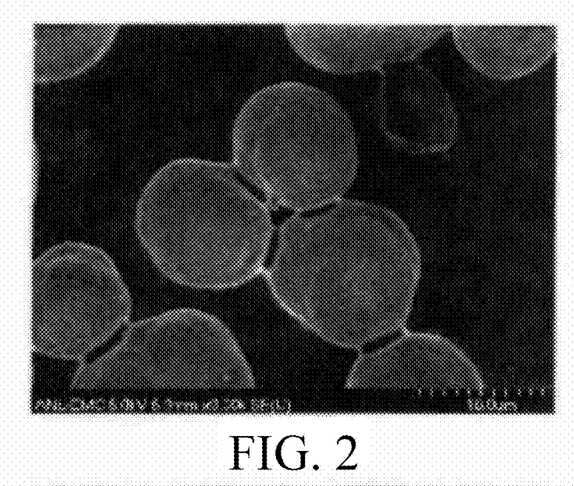
FIG. 2 is a photomicrograph of particles produced via co-precipitation methods.
Figure 3:
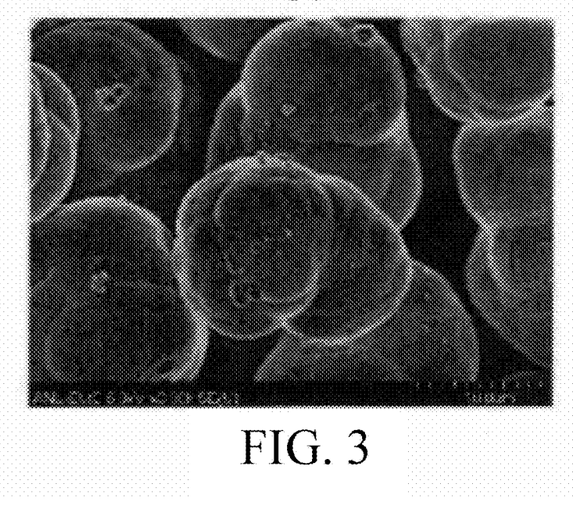
FIG. 3 is another photomicrograph of particles produced via co-precipitation methods.

FIGS. 2 and 3 are scanning electron micrograph images (×3000) of agglomerated precursor produced during co-precipitation using a continuous stirred tank reactor without centrifugal disperser. Both figures depict particles of varying sizes, and agglomerations. Both images show agglomeration and cluster formation which occurred during co-precipitation using batch or continuous stirred tank reactor conditions. As discussed supra, these conditions by themselves must be avoided to provide higher quality electrode active material.

Figure 4:
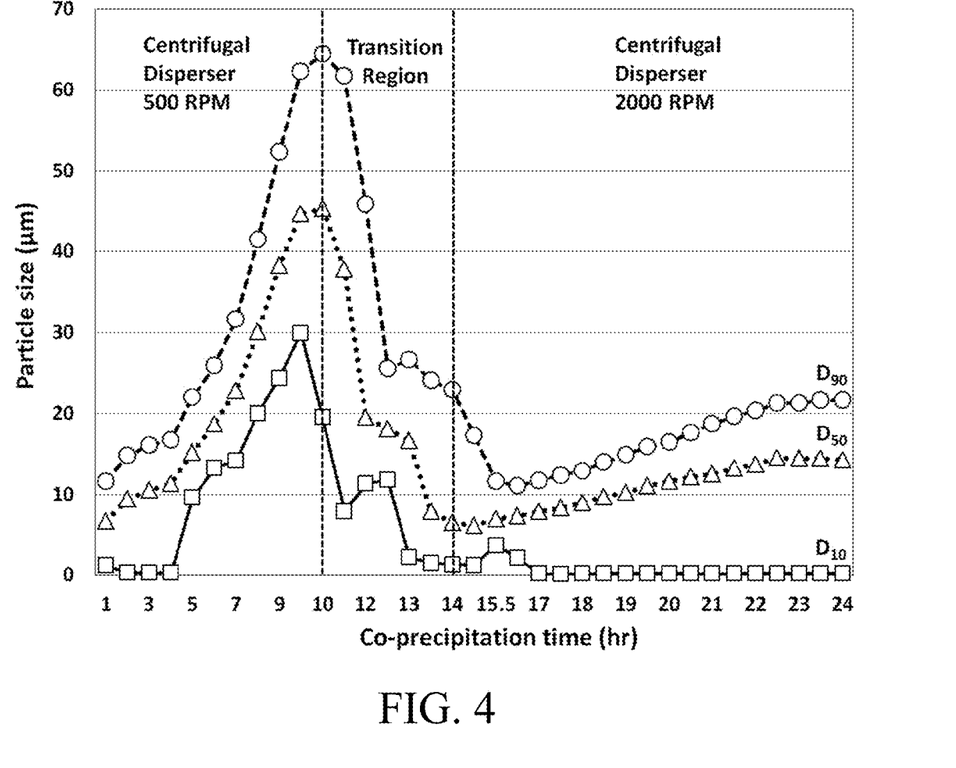
FIG. 4 is a graph of a particle size precursors produced in conjunction with a centrifugal disperser, in accordance with features of the present invention.

Surprisingly and unexpectedly, the agglomeration and widely variable morphologies seen in FIGS. 2 and 3 are avoided when centrifugal dispersers and particle size separators are combined with CSTR. The size control effect is verified by the results shown in the particle graph of FIG. 4. The inventors discovered that by adjusting the revolutions per minute (RPM) of the centrifugal disperser 2, mean particle size can be decreased by two-thirds. For example, mean particle size in the example shown decreased from 45 μm to 15 μm, when RPMs changed from about 500 RPMs to about 2000 RPMs.

Figure 5:
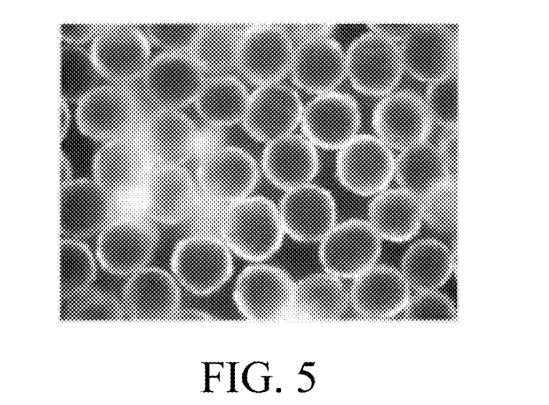
FIG. 5 is a photomicrograph of precursors produced in conjunction with a centrifugal disperser, in accordance with features of the present invention.
Figure 6:
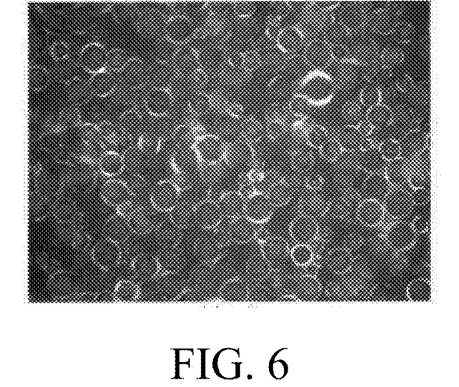
FIG. 6 is a photomicrograph of a precursor particle produced using CSTR and centrifugal dispersion, in accordance with features of the present invention.

FIGS. 5 and 6 confirm that the invented method results in no agglomeration of precursor particles. The photomicrographs further show that morphology of the particles is relegated to spheres. As discussed supra, spherical particles exhibit increased tap density compared to non-spherical particles. Further, the inventors found that small spherical particles (e.g., between 5 and 15 μm) provides better safety and electrochemical performance for batteries that large spherical particles (e.g., between 15 and 30 μm).

Figure 7:
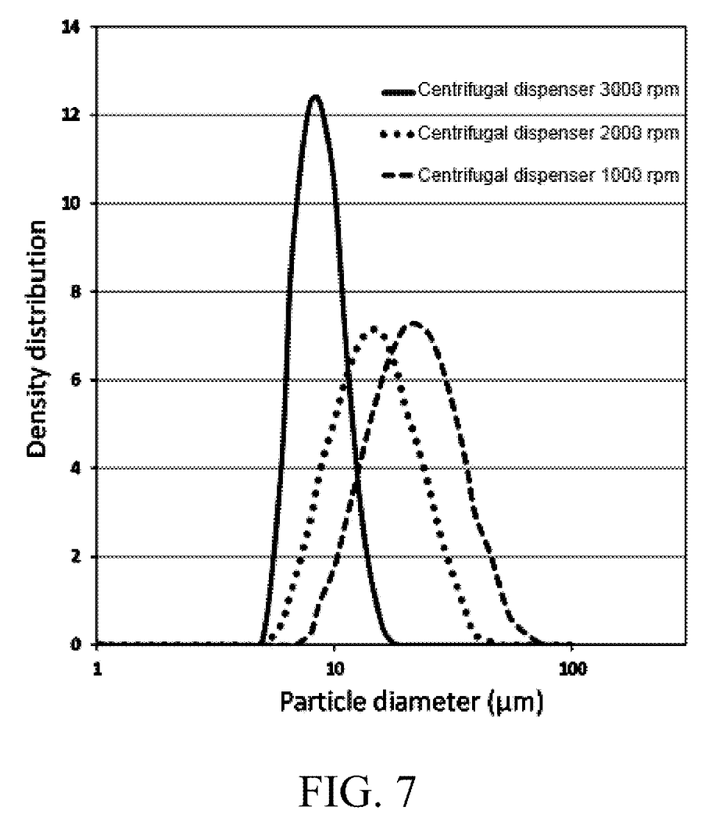
FIG. 7 is a graph of sizes of particles produced using CSTR and centrifugal dispersion, in accordance with features of the present invention.

FIG. 7 is a graph which shows that particle size of both electrode active material precursor and electrode active material decreases when RPMs of the centrifugal disperser is increase.

Figure 8:
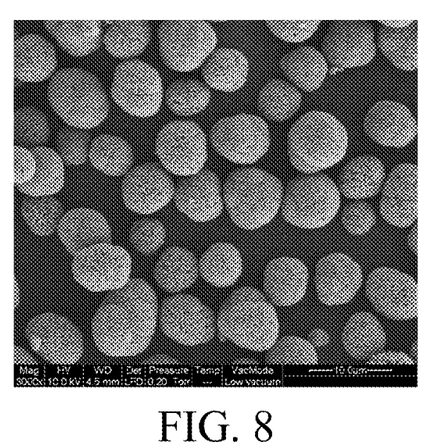
FIG. 8 is a scanning electron micrograph of active material particles produced using CSTR and centrifugal dispersion at a first rpm value, in accordance with features of the present invention.
Figure 9:
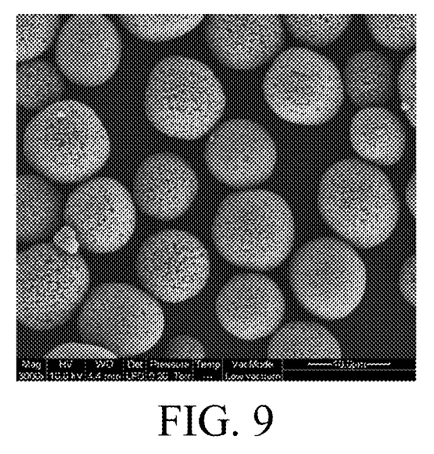
FIG. 9 is a scanning electron micrograph of electrode material comprising precursors produced using CSTR and centrifugal dispersion at a second rpm value, in accordance with features of the present invention.
Figure 10:
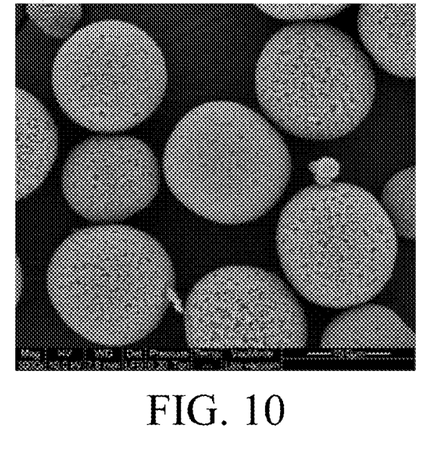
FIG. 10 is a scanning electron micrograph of electrode material comprising precursors produced using CSTR and centrifugal dispersion at a third rpm value, in accordance with features of the present invention.

FIGS. 8-10 show that size-controlled spherical electrode active materials are produced using the invented method and apparatus.

Example 1

A metal solution prepared using nickel sulfate and manganese sulfate, sodium carbonate solution and ammonia solution were fed into a 20 L CSTR with centrifugal disperser and hydrocyclone. The molar flow rate of $NiSO_4$, $MnSO_4$, $Na_2CO_3$, and $NH_4OH$ are 3.25 mol/hr, 6.5 mol/hr, 10.8 mol/hr, and 1.1 mol/hr, respectively. The ratio of metal solution to alkaline solution is approximately 1:1.2. The residence time in the reactor was approximately 2 hours and reaction temperature was approximately 50° C. This shows that the invention generates size- and morphology-controlled particles (uniform, small and spherical) in the same amount of residence time that state of the art systems take to produce inferior particles (i.e., particles exhibiting varying sizes and morphologies) with the same starting materials. Flow rate of the centrifugal disperser inlet stream was about 1 L/min and the flow rate of desired-size particle solution outlet stream was 25 percent of the tiny particle solution return stream.

Average particle sizes of nickel manganese carbonate produced was 45 pm with a continuous operation time of about 10 hours when 500 RPM was applied for the centrifugal disperser. When a 2000 RPM was applied for the centrifugal disperser, average particle size of the nickel manganese carbonate was about 15 μm with a continuous operation time of about 24 hours. These results are shown by the graph in FIG. 4.

Example 2

Rotation speed of the centrifugal disperser was varied while all other operations variables maintained as in Example 1. When 1000 RPM was applied to the centrifugal disperser, the average particle size of nickel manganese carbonates produced was about 22 μm. Then the rotation speed was increased to 2000 RPM, the average particle size was about 15 μm. When the rotation speed was increased to 3000 RPM, the average particle size was about 8 μm A density of distribution graph of nickel manganese carbonates produced by the CSTR when the centrifugal disperser's speeds are varied between 1000 and 3000 RPM is illustrated in FIG. 7. SEM images of the electrode active materials which results for the lithium secondary battery by 20 L CSTR with centrifugal disperser and hydrocyclone using these precursors are shown in FIGS. 8-10.

Reduced Wastewater Embodiment

In the first embodiment of the presently invented system as depicted in

FIG. 1 and discussed above, the tank reactor 1 is fed by feed stream 11 and by the small particle return line 14. The feed stream 11 and particle return line 14 supply the reactor tank in about a 1:1 ratio. The feed stream 11 contains a metal solution and an alkaline solution. The total contributions from each the feed stream 11 and the return line 14 include 1 part metal solution and 1 part alkaline solution from the feed stream 11 and 2 parts small particle return from the return line 14.

An alternate embodiment reduces the amount of deionized water needed for the alkaline solution. By reducing the deionized water input, the amount of wastewater in the product stream is reduced as well. In this embodiment as depicted in FIG. 14, the particle return line 14 does not supply the reactor tank 1 directly. Instead, the particle return line 14 supplies an alkaline solution preparation tank 17. The alkaline solution preparation tank 17 is also supplied by alkaline solid feed line 18. In this way, solid feed provided by line 18 homogeneously combines with the fluid contained in the particle return line 14 to produce the alkaline solution for reaction with the metal solution. The alkaline solution created in the alkaline solution preparation tank 17 is delivered to reactor tank 1 via ingress line 19.

By using the fluid in the particle return line 14 to prepare the alkaline solution, the incoming feed stock is reduced by half while still producing the same amount of solid product. Thus, the amount of deionized water needed to create the alkaline solution is halved, which also halves the amount of wastewater in the product stream. Further, the excess alkaline feed can be recycled, and the recycled liquid will already be heated to the operating temperature. An example of the reduced wastewater embodiment is provided in Example 3 below.

The multi-module embodiment of FIG. 11 is also accomplished by using multiple modules of the reduced waste water embodiment. Intermediate of the return line 14, 24, 34 and the reactor tank 1, 20, 30 will be an alkaline solution preparation tank, a solid feed line, and an ingress line. Because the volumetric inputs and outputs of each module are halved, the ultimate product stream will also be halved.

Example 3

The reactor tank 1 is fed by a 1 M metal solution from feed stream 11 at about 1 L/min and by a 0.6 M alkaline solution at 2 L/min from ingress line 19. The ratio of metal solution to alkaline solution is maintained at about 1:1.2. The solutions are mixed in the reactor tank 1 and delivered to the centrifugal dispenser 2 via conduit 12. The mixture leaves the reactor tank 1 at a volumetric rate of 3 L/min as opposed to the 4 L/min of the previous embodiment; however, the total number of moles of reactants is the same.

The mixture from the centrifugal dispenser 2 is provided to the particle separator 4. Like the previous embodiment, a solution containing small particles is returned via return line 14 at a rate of 2 L/min. Thus, the product solution is provided at a rate of 1 L/min, but the solution contains a greater density of the desired size particles. Because a lesser amount of product solution is created, less water is wasted in the recovery of the desired particles.

The return line 14 supplies the return solution to the alkaline solution preparation tank 17. Alkaline solid feed, such as NaOH or $Na_2CO_3$, is mixed with the return solution to recreate the 0.6M alkaline solution for reaction in the reactor tank.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for preparing specific sized particles, the system comprising:
   a. a continuous stir tank reactor adapted to receive reactants;
   b. a centrifugal dispenser positioned downstream from the reactor and in fluid communication with the reactor;
   c. a particle separator positioned downstream of the dispenser; and
   d. a solution stream return conduit positioned between the separator and the reactor.

2. The system as recited in claim 1 wherein the dispenser comprises a centrifugal impeller capable of rotating at between approximately 0 RPM and 10000 RPM.

3. The system as recited in claim 1 wherein the disperser is adapted to receive inlet stream at a volume that is between 0.1 and 50 percent of the volume of the reactor, per minute.

4. The system as recited in claim 1 wherein the reactants include metal solution and alkaline solution.

5. The system as recited in claim 1 wherein the particles are metal compounds selected from the group consisting of metal hydroxides, metal carbonates, metal oxalates, metal oxides, and combinations thereof.

6. The system as recited in claim 1 wherein the particles range in size from between approximately 100 nm and 40 μm.

7. The system as recited in claim 1 further comprising an alkaline solution preparation tank adapted to receive solid alkaline feedstock, wherein the alkaline solution preparation tank is positioned between the solution stream return conduit and the reactor and wherein the alkaline solution preparation tank is in fluid communication with the solution return conduit and the reactor.

8. A method for preparing specific sized particles, the method comprising:
   a. introducing reagent into a continuous stir reaction tank and allowing the reagents to react to produce product liquor containing particles;
   b. contacting the liquor particles with a centrifugal force for a time sufficient to generate particles of a predetermined size and morphology; and
   c. returning unused reagents and particles of a non-predetermined size to the tank.

9. A method as recited in claim 8 wherein the reagent comprises transition metals or nonmetals, or combinations thereof.

10. The method as recited in claim 8 wherein the reagent includes alkalinizing agents selected from the group consisting of alkali metal hydroxides, alkali metal carbonates, alkaline earth metal hydroxides, alkaline earth metal carbonates, ammonium compounds, and combinations thereof.

11. A system for preparing a plurality of specific sized particles, the system including a plurality of particle producing modules, each module comprising:
   a. a continuous stir tank reactor adapted to receive reactants;
   b. a centrifugal dispenser positioned downstream from the reactor and in fluid communication with the reactor;
   c. a particle separator positioned downstream of the dispenser for collecting the specific sized particles; and
   d. a solution stream return conduit positioned between the separator and the reactor.

12. The system as recited in claim 11 comprising three modules wherein a first of said three modules includes a means for transporting first specific sized particles to a reactor of a third of said three modules.

13. The system as recited in claim 11 comprising three modules wherein a second of said three modules includes a means for transporting second specific sized particles to a reactor of a third of said three modules.

14. The system as recited in claim 11 wherein a first module generates a primary seed particle, a second module generates a secondary seed particle and a third module generates a shell composition comprising the primary and secondary seed particles.

15. The system as recited in claim 14 wherein the primary seed particle comprises between about 1 and 99 percent by weight of the primary seed particle, secondary seed particle and shell composition.

16. The system as recited in claim 14 wherein the secondary seed particle comprises between approximately 1 and 99 percent by weight of the primary seed particle, secondary seed particle and shell composition.

17. The system as recited in claim 11, wherein each module further comprises an alkaline solution preparation tank adapted to receive solid alkaline feedstock, wherein the alkaline solution preparation tank is positioned between the solution stream return conduit and the reactor and wherein the alkaline solution preparation tank is in fluid communication with the solution return conduit and the reactor.

* * * * *